L. MEYER.

Improvement in Animal-Traps.

No. 127,701.  Patented June 11, 1872.

WITNESSES:  
Robert Burns  
Chs Rousseau

INVENTOR:  
Louis Meyer,  
per Fretiul & Co  
attys.

UNITED STATES PATENT OFFICE.

LOUIS MEYER, OF ST. LOUIS, MISSOURI.

IMPROVEMENT IN ANIMAL-TRAPS.

Specification forming part of Letters Patent No. 127,701, dated June 11, 1872.

*To all whom it may concern:*

Be it known that I, LOUIS MEYER, of St. Louis, county of St. Louis, and State of Missouri, have made a certain new and useful Improved Animal-Trap; and I do hereby declare that the following is a full and true description thereof, reference being had to the accompanying drawing and to the letters of reference marked thereon.

This invention relates to an improved semi-cylindrical-shaped trap. It consists in parts or sectional lobes hinged together, said sections open to present a full clearance to allow the entry of the animal from all sides to reach the bait, and which, on being attacked, automatically closes said sections to encircle the animal, preventing its escape. My invention also relates to certain detail improvements by which the sections when closed are prevented from being opened by the entrapped animal, all of which will now more fully appear.

To enable those herein skilled to make and use my said improvements, I will now more fully describe the same, referring to—

Figure 1:
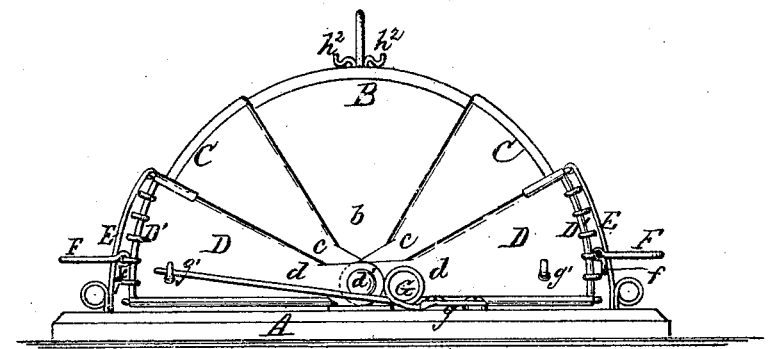
Figure 2:
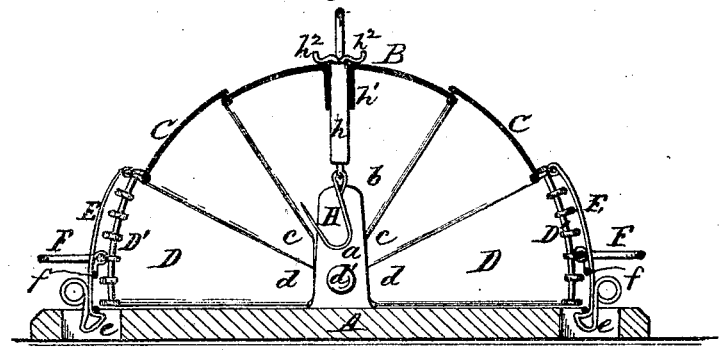
Figure 3:
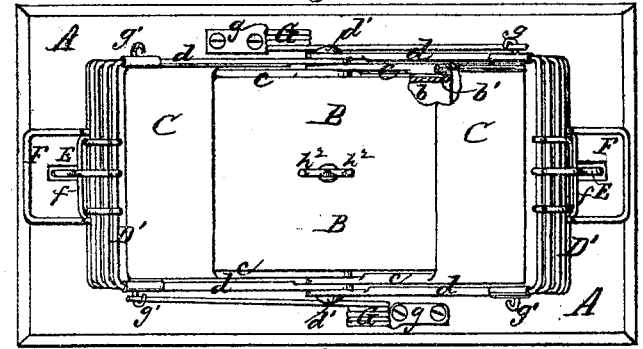

Figure 1 as a side elevation; to Fig. 2 as a sectional elevation; to Fig. 3 as a top plan.

A represents a base-piece of wood or iron. To said base-piece I secure side standard $a$. To the side standards are soldered or otherwise attached the sides $b$ of the lobe B, which forms the top-inclosing part of the trap. C and D are the further sectional lobes, which close the remaining opening part of the trap. The outer side edges $b'$ of the top lobe B are flanged or bent outward, while the top or contiguous edge of the section C is bent inward, so that said edges loop or hook into each other, as shown in Fig. 3. Similarly the lower edge of the section C is bent outward, while the top or contiguous rim-edge of the section D is bent inward to hook into each other, as indicated in Fig. 3. The sectional lobes C and D thus formed, have their respective sides $c$ and $d$ journaled by a connecting-pin or bolt, $d'$, (proper washers setting the joints sufficiently apart,) and so that said sections fold up over each other, and also partly over the top lobe B, as shown in the figures. The transverse full face of the lower sectional lobes D are properly fenced by a wire-fender, D'. Thus the inside of the trap can readily be inspected. The lower sections D are prevented being opened by the force of the entrapped animal, by the wire springs E with which each fender is provided, said springs being fitted to engage by their hook ends $e$ in a suitable catch in the base A, as shown. The trap in its closing action causes the springs E to hook in their catches, and thus the sections are prevented from being uplifted. Also, it will be noticed that the hooking of the edges of the sections, as described, prevents the animal from forcing said sections apart, as well as facilitates the simultaneous closing of the trap, one section forcing the other section to close with it. The wire fenders have handles F. These are formed so as to have a projecting cross-wire, F, fitted to act upon the springs, and release them out of engagement from their catches. (See Fig. 2.) The operator can therefore with both hands and at the same time in the lift movement of the lobes disengage each spring to set the trap. To insure an automatic closing of the sections when the trap is set, I attach to each side of the base A the coil springs G. One end of said springs is properly secured in a bracket, $g$, to base, the other end made to extend and rest in the stays $g'$, with which each side of the lower sections is provided, as shown in Figs. 1 and 3. The top lobe B is provided with a bait-hook, H. Said hook has its shank $h$ vertically adjustable in a sleeve, $h^1$, and terminates in the catch $h^2$, as clearly shown in Fig. 2.

The trap is set by folding the sections C and D so that the wire fenders of each section D delicately engage the catch $h^2$ of the bait-hook. The animal entering and attacking the bait on the hook immediately disengages its catch $h^2$ from the fenders; the folded sections are thus caused by the tension of the springs G to close the trap and entrap the animal. If deemed necessary the lower corners of the lobes D can be provided with rubber tips to deaden the noise resulting from the closing action of the trap.

Having thus fully described my said invention, what I claim is—

1. The arrangement of the wire fenders D', springs E, handles F to operate in combination with a trap consisting of hinged sectional lobes B, C, and D, bait and set hook H, coil side springs G, and base A, substantially as and for the purpose set forth.

2. A trap, consisting of the sectional lobes B C D, the edges of said sections formed to hook into each other, as described, bait and set hook H, fenders D', springs E, handles F, coil springs G, and base A, arranged to operate as and for the purpose set forth.

In testimony of said invention I have hereunto set my hand.

LOUIS MEYER.

Witnesses:
 WILLIAM W. HERTHEL,
 ROBERT BURNS.